(12) United States Patent
Elsayed et al.

(10) Patent No.: US 11,431,925 B1
(45) Date of Patent: Aug. 30, 2022

(54) PIXEL RAMP GENERATOR CONTROLLER FOR IMAGE SENSOR

(71) Applicant: SHENZHEN GOODIX TECHNOLOGY CO., LTD., Shenzhen (CN)

(72) Inventors: Mohamed Elsayed, San Diego, CA (US); Mohit Kumar, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 4 days.

(21) Appl. No.: 17/194,294

(22) Filed: Mar. 7, 2021

(51) Int. Cl.
 *H04N 5/353* (2011.01)
 *H04N 5/3745* (2011.01)
 *H04N 5/357* (2011.01)

(52) U.S. Cl.
 CPC ......... *H04N 5/353* (2013.01); *H04N 5/37455* (2013.01); *H04N 5/3577* (2013.01)

(58) Field of Classification Search
 CPC .......... H03M 1/56; H03M 1/54; H04N 5/353; H04N 5/3577; H04N 5/363; H04N 5/37455
 See application file for complete search history.

(56) References Cited

U.S. PATENT DOCUMENTS

| | | | |
|---|---|---|---|
| 11,303,293 B1* | 4/2022 | Elsayed | H03M 1/54 |
| 2006/0013485 A1* | 1/2006 | Nitta | H04N 5/367 |
| | | | 382/194 |
| 2010/0271248 A1* | 10/2010 | Yamaoka | H03K 5/082 |
| | | | 327/131 |
| 2018/0167573 A1* | 6/2018 | Zhu | H04N 5/378 |
| 2020/0227101 A1* | 7/2020 | Yoshida | H03L 7/14 |

* cited by examiner

*Primary Examiner* — Antoinette T Spinks
(74) *Attorney, Agent, or Firm* — Kilpatrick Townsend & Stockton LLP

(57) ABSTRACT

Techniques are described for controlling operation of a pixel conversion ADC in a manner that enforces strict timing and synchronization of ramp and clock signaling. Synchronizing techniques can be applied to generate a corrected ramp start signal based on synchronizing a received ramp start signal to an input clocking signal, and to generate a controller clock signal based on synchronizing an input clocking signal to the corrected ramp start signal. The corrected ramp start signal and the controller clock signal can be used to control generation of a ramp enable signal for controlling timing of pixel ramp voltage generation digital pixel conversion counting, and to control generation of an output clocking signal used by the digital pixel conversion counting.

20 Claims, 7 Drawing Sheets

US 11,431,925 B1

PIXEL RAMP GENERATOR CONTROLLER FOR IMAGE SENSOR

FIELD

The invention relates generally to image sensors. More particularly, embodiments relate to controllers for ramp generator circuits for use with pixel conversion in complementary metal-oxide semiconductor (CMOS) image sensors.

BACKGROUND

Many electronic devices include cameras and other features that rely on digital image sensors. For example, most modern smartphones include one or more digital cameras that rely on digital image sensing hardware and software to capture and process images. Such applications often perform image sensing using a complementary metal-oxide semiconductor (CMOS) image sensor (CIS). Over time, consumers have desired increased performance from these image sensors, including higher resolution and lower noise. Further, particularly in portable electronic devices (e.g., with fixed battery capacity), it has been desirable to provide such features without adversely impacting power consumption and dynamic range. For example, analog power drives a significant, if not dominant, part of the power consumption of a modern CIS. As such, implementing a high-performance CIS in a portable electronic device can involve designing analog-to-digital converters (ADCs) and other components within strict power efficiency and noise constraints.

The ADCs in the CMOS image sensors convert analog pixel information into digital code. Conventional architectures typically include a ramp-based ADC that compares an analog pixel output voltage (corresponding to signal intensity detected by the pixel) against a reference ramp voltage. Typically, a same ramp voltage is shared across an entire row of pixels. As modern image sensors can typically include thousands of pixels in each row, there can typically be thousands of comparators being used in the row for analog-to-digital conversion, all based on the same ramp voltage. The comparator and the ramp generator can be significant sources of noise in each row of pixels, and image quality can depend appreciably on keeping that noise well below other pixel noise (e.g., random pixel noise).

Because image sensor applications are so sensitive to ramp generator noise, many such applications place strict design requirements on ramp generation circuits. For example, high performance in image sensor applications can depend to an extent on tight control of ramp voltage synchronization and other timing, even while consuming minimal power and area. Conventional approaches have tended to be incapable of meeting such design requirements in context of ever-increasing clock speeds, pixel numbers, pixel densities, and other design specifications.

BRIEF SUMMARY OF THE INVENTION

Embodiments control operation of a pixel conversion ADC in a manner that enforces strict timing and synchronization of ramp and clock signaling. For example, synchronizing techniques are applied to generate a corrected ramp start signal based on synchronizing a received ramp start signal to an input clocking signal, and to generate a controller clock signal based on synchronizing an input clocking signal to the corrected ramp start signal. A ramp enable signal can then be controlled to enable ramp generation over a predetermined ramp duration that begins responsive to the corrected ramp start signal and ends after a predetermined number of cycles of the controller clock signal. Output of an output clocking signal can also be controlled to track the controller clock signal over a predetermined clock duration that begins responsive to the corrected ramp start signal and ends after a predetermined number of cycles of the controller clock signal. Some embodiments can control pixel conversion based at least on the controlled ramp enable signal and output clocking signal. For example, for each pixel in a row of pixels, a respective analog pixel response level can be compared to a ramp voltage that is generated responsive to the ramp enable signal to generate a respective pixel output signal, and a respective digital output value can be generated to represent a counted number of clock cycles of the output clocking signal corresponding to the respective pixel output signal.

According to one set of embodiments, a pixel ramp generator controller is provided. The pixel ramp generator controller includes: a ramp-to-clock synchronizer to generate a corrected ramp start signal based on synchronizing a received ramp start signal to an input clocking signal; a clock-to-ramp synchronizer coupled with the ramp-to-clock synchronizer to generate a controller clock signal based on synchronizing the input clocking signal to the corrected ramp start signal; and a ramp timing controller coupled with the ramp-to-clock synchronizer and the clock-to-ramp synchronizer. The ramp timing controller is to: generate a ramp enable signal that indicates to start charging a ramp voltage responsive to assertion of the corrected ramp start signal, and to stop charging the ramp voltage responsive to detecting that a predetermined ramp duration has elapsed after the corrected ramp start signal; and generate an output clocking signal from the controller clock signal, such that generating the output clocking signal begins responsive to assertion of the corrected ramp start signal and ends responsive to detecting that a predetermined clock duration has elapsed after the corrected ramp start signal.

According to another set of embodiments, a pixel analog-to-digital conversion (ADC) system is provided. The pixel ADC system includes: a pixel ramp generator controller configured to: assert a ramp enable signal beginning responsive to a corrected ramp start signal and continuing for a predetermined ramp duration; and generate an output clocking signal that tracks a controller clock signal beginning responsive to the corrected ramp start signal and continuing for a predetermined clock duration, wherein the corrected ramp start signal corresponds to a received ramp start signal synchronized to an input clocking signal, and the controller clock signal corresponds to an input clocking signal synchronized to the corrected ramp start signal. The pixel ADC system further includes: a ramp generator coupled with the pixel ramp generator controller to generate a ramp voltage responsive to the ramp enable signal; a plurality of pixel comparators coupled with the ramp generator, each to generate a respective pixel output signal responsive to comparing a respective analog pixel response level with the ramp voltage; and a plurality of pixel counters, each coupled with a respective one of the plurality of pixel comparators and with the pixel ramp generator controller to output a respective digital output value representing a counted number of clock cycles of the output clocking signal corresponding to the respective pixel output signal of the respective one of the plurality of pixel comparators.

According to another set of embodiments, a method is provided for pixel conversion in an image sensor. The method includes: synchronizing a received ramp start signal to an input clocking signal to generate a corrected ramp start signal; synchronizing the input clocking signal to the corrected ramp start signal to generate a controller clock signal; asserting a ramp enable signal beginning responsive to the corrected ramp start signal and continuing for a predetermined ramp duration; outputting an output clocking signal that tracks the controller clock signal beginning responsive to the corrected ramp start signal and continuing for a predetermined clock duration; and converting a plurality of analog pixel response levels of a plurality of pixels to a corresponding plurality of digital output values by, for each pixel, comparing a respective one of the plurality of analog pixel response levels to a ramp voltage generated responsive to the ramp enable signal to generate a respective pixel output signal, and generating a respective one of the plurality of digital output values to represent a counted number of clock cycles of the output clocking signal corresponding to the respective pixel output signal.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Figure 1:
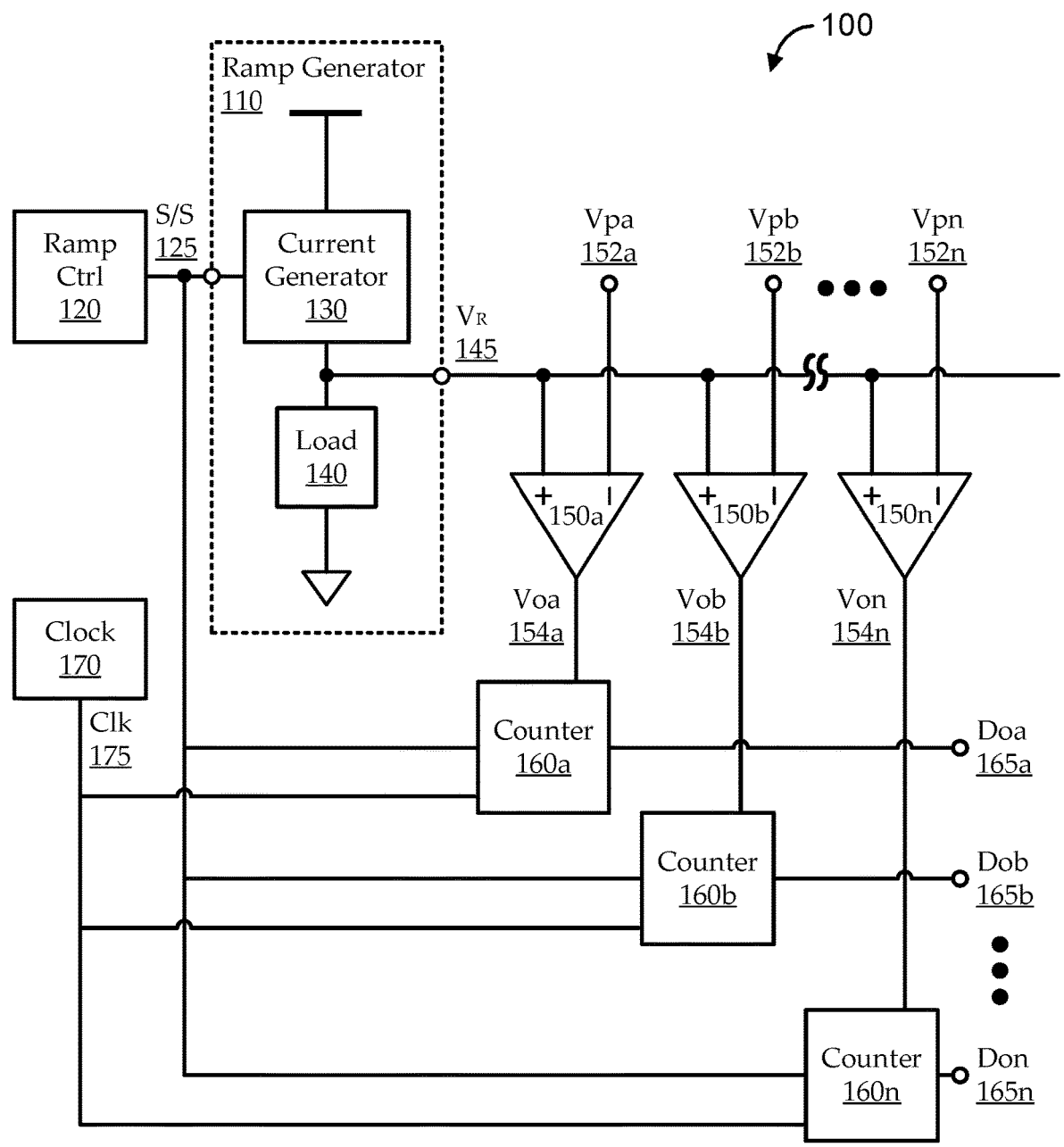
FIG. 1 shows an illustrative conventional pixel analog-to-digital converter (ADC) system.

FIG. 1 shows an illustrative conventional pixel analog-to-digital converter (ADC) system 100. As illustrated, the conventional ADC system 100 includes a conventional ramp generator controller 120 coupled with a pixel ramp voltage generator 110 and a number of counters 160. The pixel ramp voltage generator 110 is coupled with a number of comparators 150, which are also coupled with the counters 160. The pixel ramp voltage generator 110 generates a ramp voltage, which can essentially be a voltage that begins at a low starting level and charges to a high ending level in a substantially linear fashion. A simplified block diagram of the conventional pixel ramp voltage generator 110 is illustrated as including a current generator 130 and a load 140.

To generate a ramp voltage output (VR) 145, the ramp generator controller 120 can assert a ramp start signal 125. For example, a start/stop (S/S) signal is used, where ramp start corresponds to one state of the signal (e.g., HIGH), and ramp stop corresponds to the complementary state of the signal (e.g., LOW). In response to the ramp start signal 125, the current generator 130 begins flowing a charging current through the load 140, which charges the load 140. As one example, the current generator 130 includes transistors, or the like, to inject a substantially constant charging current into a capacitive load 140. Injecting the charging current into the load 140 can cause the voltage across the capacitive load 140 (corresponding to VR 145) to increase substantially linearly with time. As another example, the current generator 130 includes a programmable current source (e.g., a current digital-to-analog converter controlled by an input code) to inject a changing charging current into a resistive load 140. The input code, or other control of the programmable current source, is adjusted over the ramp cycle such that the changing charging current injected into the load 140 cause the voltage across the resistive load 140 (corresponding to VR 145) to increase substantially linearly with time.

The output of the pixel ramp voltage generator 110, a same VR 145, is coupled with a first input (e.g., the positive input) of each of the comparators 150. For example, in this way, the same ramp voltage is shared across all comparators 150 of a row of pixels of an image sensor. The other input (e.g., the negative input) of each of the comparators 150 is coupled with a respective pixel response voltage 152 for a corresponding pixel. For example, the pixel response voltage 152 is an analog output of the pixel corresponding to the intensity of light (e.g., number of photons) detected by the pixel. Each comparator 150 compares its respective pixel response voltage 152 to VR 145. VR 145 can be configured so that the ramp begins at a level assumed to be below any pixel response voltage 152, and so that the ramp ends at a level assumed to be above any pixel response voltage 152. At some point in a pixel conversion cycle, the linearly changing level of VR 145 will cross the level of the pixel response voltage 152, thereby triggering a change in state of the output of the corresponding comparator 150. As different levels of pixel response voltage (Vp) 152 will result in different timing for the state change at the output of the comparator 150, the timing can be used as a measure of a pixel output voltage (Vo) 154 for that pixel.

For example, each counter 160 receives the ramp start signal 125, a respective pixel output voltage 154, and a clock signal 175 from a clock circuit 170. When the ramp start signal 125 triggers the ramp voltage to begin charging, the ramp start signal 125 can also trigger the counters 160 to begin counting cycles of the clock signal 175. When the level of VR 145 crosses the respective pixel response voltage 152 for the comparator 150 coupled with any given counter 160, the respective pixel output voltage changes state and triggers the counter 160 to stop counting. A higher respective pixel response voltage 152 will result in a higher counted number of elapsed cycles of the clock signal 175. The count can be output by the counters 160 as digital output signals 165, such that each digital output signal 165 from each counter 160 is a digital value representing the analog pixel response voltage 152 of its coupled comparator 150.

Figure 2:
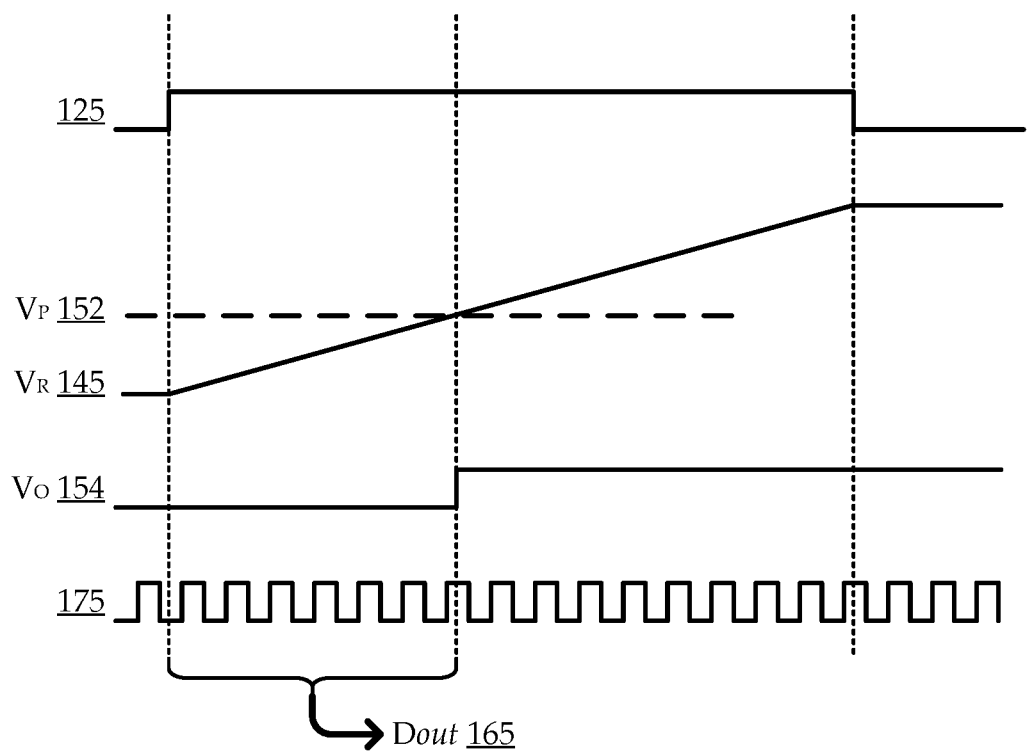
FIG. 2 shows simplified plots of illustrative signals of FIG. 1.

For added clarity, FIG. 2 shows simplified plots of illustrative signals of FIG. 1. As illustrated, a change in state of a start signal 125 (e.g., a rising edge) triggers the ramp voltage 145 to begin rising from some low starting level. The ramp voltage 145 can continue to rise (e.g., substantially linearly) over some period of time. For example, the ramp start signal 125 can be de-asserted after a predetermined duration of time, after the ramp voltage 145 reaches a predetermined maximum level, etc. At some point, as the ramp voltage 145 increases, it crosses the level of an illustrative pixel response voltage 152. For example, the pixel response voltage 152 corresponds to a detected intensity of a photodetector at a pixel corresponding to the pixel response voltage 152. As illustrated in FIG. 1, when the rising level of the ramp voltage 145 crosses the pixel response voltage 152 level, the state of the output of a corresponding comparator 150 changes, and that output (pixel output voltage 154) can be used as a stop signal. It can be seen in FIG. 2 that the stop signal (i.e., Vo 154) changes state responsive to the level of the ramp voltage 145 crossing the pixel response voltage 152 level.

An input clock signal 175 is also shown. The input clock signal 175 may be any suitable periodic signal, but is typically a square wave with approximately 50-percent duty cycle. As described with reference to FIG. 1, a counter 160 can be triggered to start counting cycles of the input clock signal 175 (e.g., rising edges, or other detectable state changes) responsive to the start signal 125 and to stop counting cycles of the input clock signal 175 responsive to the change in state of Vo 154. The number of elapsed cycles of the input clock signal 175 between the start signal 125 and the state change of Vo 154 can be used as a measure of the pixel response voltage 152 and can be output by the counter 160 as the digital output 165.

In CMOS image sensor applications, the pixel ramp voltage generator 110 and the comparators 150 can tend to contribute appreciable noise to the pixel outputs (e.g., as artifacts on pixel output voltages 154). For example, it can be seen in FIG. 1 that the same ramp voltage (VR 145) is shared by many pixels, such as across an entire row of pixels. As modern image sensors can typically include thousands of pixels in each row, there can typically be thousands of comparators 150 being used in the row for analog-to-digital conversion based on the same VR 145. Many typical image sensor applications are designed to operate within very strict noise specifications at least because the human eye can detect noise patterns even well below random pixel noise levels. For example, human eyes will tend to notice image distortion even where half of a pixel row has added voltage noise that is 10× below (i.e., ten times less that) the random noise level of the individual pixels in the row. One such specification, referred to as "row-temporal noise," relates to variations in the average noise of a pixel row. For example, counter outputs (e.g., digital output 165) can be averaged across a row in different frames, and variations of this average across multiple frames can represent the row-temporal noise. Many conventional consumer image sensor applications specify a maximum row-temporal noise of around 20× below the comparator 150 and pixel noise levels. Because noise from the pixel ramp voltage generator is repeated on all the comparator outputs, the average noise of any row tends to strongly correlate to noise in VR 145.

Conventional architectures struggle to meet row-temporal noise specifications and/or other noise specifications. A number of different approaches tend to be taken by conventional architectures. One conventional approach is to use multiple conversion phases to reduce low-frequency noise from the pixel ramp voltage generator 110 and comparators 150. The process of beginning the ramp, detecting respective timing of ramp level crossings for all the pixels in a row, and ending the ramp can be considered as a pixel row conversion cycle. Many image sensor designs use a two-phase conversion cycle, whereby two conversion phases are used in each cycle for each pixel in each row to generate an ADC result. For example, in a first phase, a reset voltage on each pixel line is converted. The reset voltage does not include image information, but it tends to include various noise artifacts, such as low-frequency noise from the pixel ramp voltage generator 110 and the comparators 150. In a second phase, the reset voltage plus the image information are converted. By subtracting the two outputs, the reset voltage is cancelled out, while image information is retained. Because some of the noise is common in both phases, the subtraction tends to reduce the noise influences of the pixel ramp voltage generator 110 and the comparators 150 (e.g., much of the low-frequency noise), as long as that noise does not appreciably change between the two conversion phases. Some examples of architectures designed to efficiently perform multi-phase pixel conversions are described in U.S. patent application Ser. No. 17/191,704, titled "LOADABLE TRUE-SINGLE-PHASE-CLOCKING FLOP-BASED COUNTER," filed on Mar. 4, 2021, the entire disclosure of which is hereby incorporated in its entirety.

Even with multi-phase conversion approaches, excessive amounts of noise can manifest on VR 145 for a number of reasons. One reason is that, with all the ADCs (specifically the comparators 150) in a row coupled to a same VR 145, any noise from the ramp generator can be correlated noise across the pixels in a row, which can be noticeable to the human eye even at very low levels. Another reason is that triggering of any comparator 150 in a row (i.e., a change in state of the pixel output voltage 154) can manifest a kickback voltage on the shared VR 145 for that row. In some cases, the disturbance on VR 145 caused by such a kickback voltage can cause subsequent mis-conversions of other pixels in the row, especially where there are sharp transitions. Thus, even at very low levels, these and other sources of noise in the pixel ramp voltage generators can result in detectable image blurring and/or other image distortions. Some examples of pixel ramp generators designed to address such noise-related concerns are described in U.S. patent application Ser. No. 17/187,806, titled "PIXEL RAMP GENERATOR FOR IMAGE SENSOR," filed on Feb. 28, 2021, the entire disclosure of which is hereby incorporated in its entirety.

Even implementing multiple-phase pixel conversions with low-noise pixel ramp voltage generators 110, comparators 150, and other components, row-temporal noise specifications and/or other noise specifications can be difficult to meet particularly in applications running at very high clock speeds. It has been found that a remaining source of such noise relates to signal timing. As can be seen in FIG. 2, the ramp start signal 125 is asynchronous to the clock signal 175 (i.e., assertion or de-assertion of the ramp start signal 125 is not necessarily coincident with a clock edge of the clock signal 175). Slight timing offsets between triggering of the ramp and/or triggering of conversion counting relative to clock signal 175 edges can result in counter 160 outputs, and the corresponding analog-to-digital conversion, being very slightly off (e.g., by a value of a single bit). In almost any application outside of high-performance image sensors, and even for image sensors having lower pixel conversion resolutions and/or clock speeds, such minor counting discrepancies are unnoticeable and insignificant. As such, these slight timing issues have tended to be ignored by conventional ADC designs.

In context of high-performance image sensors, even these minor counting discrepancies due to asynchronous triggering can be common across an entire row of pixels, such that they can contribute to row-temporal noise and can be noticeable. To avoid such concerns, strict design specifications can be placed on the ADC, including strict timing requirements. For example, an ADC design may specify a requirement to control the start of the ramp to be synchronized to a clock edge with timing accuracy of less than five percent of a clock period, to control stopping the ramp to stop after a predefined time period, to control enabling an output clock during the ramp time to run for a predefined number of clock cycles, to control generation of the output clock to ensure that the generated output clock does not have a degraded duty cycle for the first clock period, to operate at very high clock speeds (e.g., 3 Gigahertz); to operate at low power, etc.

Embodiments described herein include various circuits and processes to control operation of a pixel conversion ADC in a manner that enforces strict timing and synchronization of ramp and clock signaling. For example, synchronizing techniques are applied to generate a corrected ramp start signal based on synchronizing a received ramp start signal to an input clocking signal, and to generate a controller clock signal based on synchronizing an input clocking signal to the corrected ramp start signal. A ramp enable signal can then be controlled to enable ramp generation over a predetermined ramp duration that begins responsive to the corrected ramp start signal and ends after a predetermined number of cycles of the controller clock signal. Output of an output clocking signal can also be controlled to track the controller clock signal over a predetermined clock duration that begins responsive to the corrected ramp start signal and ends after a predetermined number of cycles of the controller clock signal. Some embodiments can control pixel conversion based at least on the controlled ramp enable signal and output clocking signal. For example, for each pixel in a row of pixels, a respective analog pixel response level can be compared to a ramp voltage that is generated responsive to the ramp enable signal to generate a respective pixel output signal, and a respective digital output value can be generated to represent a counted number of clock cycles of the output clocking signal corresponding to the respective pixel output signal.

Figure 3:
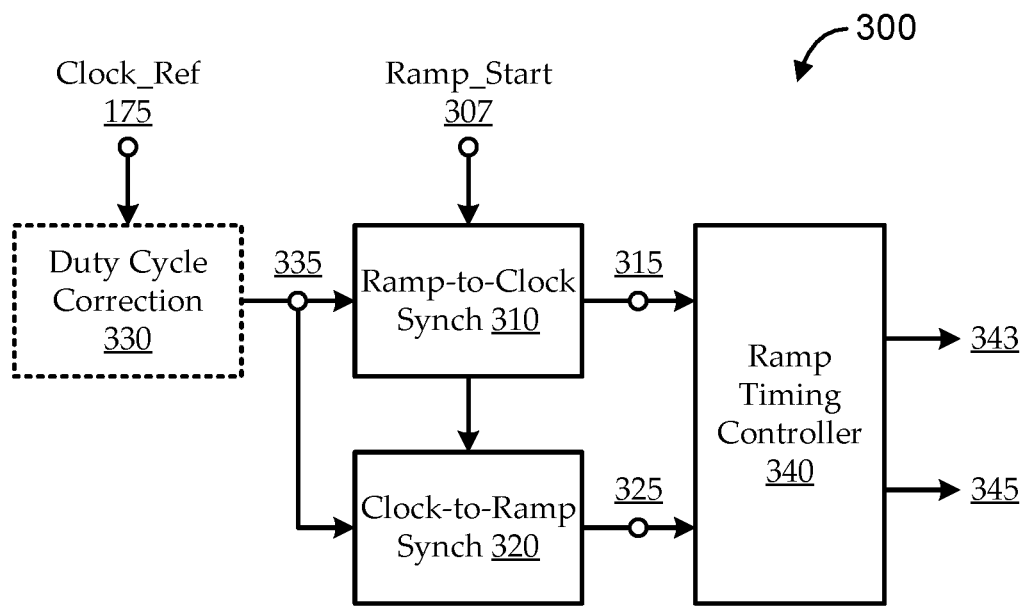
FIG. 3 shows a novel pixel ramp generator controller, according to embodiments described herein.

FIG. 3 shows a novel pixel ramp generator controller 300, according to embodiments described herein. Embodiments can generally output a ramp enable signal 343 and an output clocking signal 345 based on a received ramp start signal 307 and an input clocking signal 335 (or a reference clocking signal 175, as described below). The input clocking signal 335 is a high-frequency clock (e.g., above 1 GHz) that is always running (e.g., at least during operation of the image sensor). The received ramp start signal 307 essentially indicates a request from a higher-level controller for generating a ramp voltage to be used for a pixel conversion cycle. The received ramp start signal 307 is generated asynchronously with respect to the input clocking signal 335. However, it can be desirable to ensure that the ramp begins (i.e., that the ramp voltage begins to charge, or ramp up, from an initial level) with very high timing accuracy. For example, a system-level requirement of an image sensor may specify that any delay between the start of the ramp and the start of a clock period of the input clocking signal 335 is repeatably within five percent (i.e., the amount of relative delay is substantially the same for all repetitions of the ramp). Such strict timing requirements can help to reduce coherent noise, such as row-temporal noise. As described above, when repeated across an entire row of pixels, the human eye can detect noise levels that are an order of magnitude below even the least-significant bit (LSB) quantization error of the pixels. The inventors have recognized that one source of this coherent row-temporal noise is the asynchronicity between the ramp start signal and clocked components of the ADC, such as the counters. If the counters for a row begin slightly too early or too late relative to the start of the ramp, the resulting count value for the conversion can be too high or too low for pixels in that row. This effect can be magnified further when timing mismatches result in the count values being off, but in the opposite direction, for adjacent rows (e.g., one row conversion may include count values that are one bit value too high, and the adjacent row conversion may include count values that are one bit value too low). Thus, strict timing enforcement can help to reduce these sources of row-temporal noise.

As illustrated, the pixel ramp generator controller 300 includes a ramp-to-clock synchronizer 310, a clock-to-ramp synchronizer 320, and a ramp timing controller 340. Embodiments of the ramp-to-clock synchronizer 310 generate a corrected ramp start signal 315 based on synchronizing the received ramp start signal 307 to the input clocking signal 335. The ramp-to-clock synchronizer 310 can generate the corrected ramp start signal 315 such that assertion of the received ramp start signal 307 manifests as assertion of the corrected ramp start signal 315 delayed to synchronize with a triggering edge (e.g., a rising edge) of the input clocking signal 335. In some implementations, the amount of delay is selected to maximize the probability of a stable transition state at the output of the ramp-to-clock synchronizer 310 (e.g., to minimize a probability of a metastable condition at the output of the ramp-to-clock synchronizer 310).

Embodiments of the clock-to-ramp synchronizer 320 are coupled with the ramp-to-clock synchronizer 310 to generate a controller clock signal 325 based on synchronizing the input clocking signal 335 to the corrected ramp start signal 315. The ramp-to-clock synchronizer 310 delays the received ramp start signal 307 to synchronize with a triggering edge of the input clocking signal 335, but components of the ramp-to-clock synchronizer 310 can also generate delay unrelated to the input clocking signal 335. Thus, controlling the ramp enable signal 343 and/or the output clocking signal 345 directly using the corrected ramp start signal 315 and the input clocking signal 335 can lead to a clock glitch (e.g., a clipped first used clock period). The clock-to-ramp synchronizer 320 can generate the controller clock signal 325 as a glitch-free clocking signal for use in controlling the ramp enable signal 343 and/or the output clocking signal 345.

Embodiments of the ramp timing controller 340 are coupled with the ramp-to-clock synchronizer 310 and the clock-to-ramp synchronizer 320 to control generation and output of the ramp enable signal 343 and the output clocking signal 345. Embodiments can control the ramp enable signal 343 to indicate to start charging a ramp voltage in accordance with the corrected ramp start signal 315, and to stop charging the ramp voltage after elapsing of a predetermined ramp duration. For example, the ramp enable signal 343 can be asserted upon detecting assertion of the corrected ramp start signal 315, and the ramp enable signal 343 can be de-asserted after a number of clock cycles of the controller clock signal 325 corresponding to the predetermined ramp duration. Embodiments of the ramp timing controller 340 can similarly control the output clocking signal 345 to track the controller clock signal 325 in accordance with the corrected ramp start signal 315, and to stop tracking the controller clock signal 325 after elapsing of a predetermined clock duration. For example, the output clocking signal 345 is effectively a pass-through of the controller clock signal 325 during the predetermined clock duration, beginning upon detecting assertion of the corrected ramp start signal 315 and ending after a number of clock cycles of the controller clock signal 325 corresponding to the predetermined clock duration; and the output clocking signal 345 is de-asserted (e.g., and/or held at any suitable constant level) otherwise. References herein to "asserting" and "de-asserting" signals, and the like, are intended generally to refer to any suitable manner of controlling the signals to manifest a desired indication or state. For example, in one embodiment, components are implemented so that a signal is considered "asserted" upon transitioning from a logic LOW state to a logic HIGH state; in another embodiment, components are implemented so that the same signal is considered "asserted" upon transitioning from a logic HIGH state to a logic LOW state.

In some embodiments, it is desirable for the clocking signals to be substantially ideal square waves. For example, performance can be further improved in some cases by ensuring that the controller operates according to clocking signals with a fifty-percent duty cycle. Such embodiments can further include a duty cycle correction block 330. The duty cycle correction block 330 can receive a reference clocking signal 175 from a reference clock generator, and can generate the input clocking signal 335 by adjusting the duty cycle of the reference clocking signal 175 to fifty percent (i.e., to as close to fifty percent as practicable).

Figure 4:
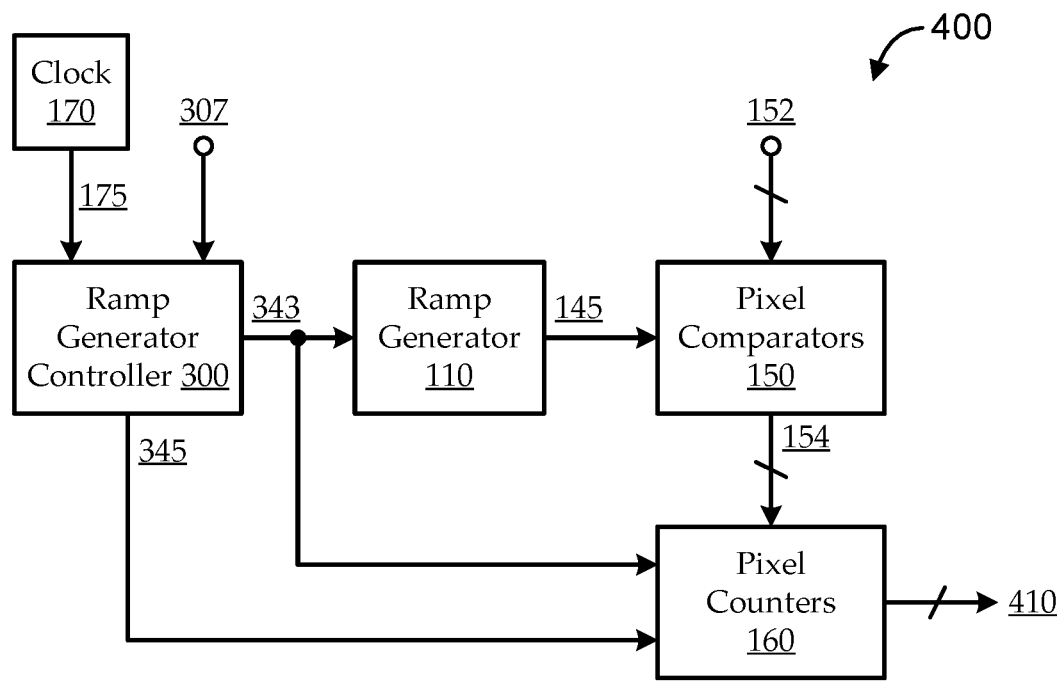
FIG. 4 shows a block diagram of an illustrative novel pixel ADC system, according to various embodiments.

FIG. 4 shows a block diagram of an illustrative novel pixel ADC system 400, according to various embodiments. The novel pixel ADC system 400 incorporates a pixel ramp generator, such as the novel pixel ramp generator controller 300 of FIG. 3. For example, the pixel ramp generator controller 300 is configured to assert a ramp enable signal 343 beginning responsive to a corrected ramp start signal 315 and continuing for a predetermined ramp duration, and to generate an output clocking signal 345 that tracks a controller clock signal 325 beginning responsive to the corrected ramp start signal 315 and continuing for a predetermined clock duration. As described above, the corrected ramp start signal 315 corresponds to a received ramp start signal 307 synchronized to an input clocking signal 335, and the controller clock signal 325 corresponds to the input clocking signal 335 synchronized to the corrected ramp start signal 315. In some cases, the input clocking signal 335 is a duty-cycle-corrected version of a reference clock signal 175 received from a reference clock source 170. For example, the reference clock signal 175 has a frequency of at least 1 GHz.

Similar to FIG. 1, embodiments of the novel pixel ADC system 400 can include a ramp generator 110, multiple pixel comparators 150, and multiple pixel counters 160. For example, for a row of R pixels in an image sensor, each pixel is associated with a respective pixel comparator 150 and a respective pixel counter 160. The ramp generator 110 can be coupled with the pixel ramp generator controller 300 to generate a ramp voltage 145 responsive to the ramp enable signal 343. Each of the pixel comparators 150 can generate a respective pixel output signal 154 responsive to comparing a respective analog pixel response level 152 with the ramp voltage 145. Each of the pixel counters 160 can be coupled with a respective one of the pixel comparators 150 and with the pixel ramp generator controller 300 to output a respective digital output value 410. Each digital output value 410 can represent a counted number of clock cycles of the output clocking signal 345 corresponding to the respective pixel output signal 154 of the respective one of the pixel comparators 150. For example, each pixel conversion count performed by the pixel counters 160 can be triggered to begin by the ramp enable signal 343 and can run for a number of clock cycles of the output clocking signal 345 corresponding to a magnitude of the analog pixel response level 152.

It can be seen in FIG. 2 that a pulse width of the pixel output signal 154 correlates to a magnitude of the analog pixel response level 152. As each counted number of clock cycles of the output clocking signal 345 corresponds to a respective pixel output signal 154, the range of possible values of the counted number of clock cycles can be defined according to minimum and maximum magnitudes of analog pixel response levels 152. In some embodiments, the predetermined ramp duration and the predetermined clock duration are longer than the maximum counted number of clock cycles based on a maximum magnitude for the analog pixel response levels 152. For example, the ramp and output clock can both run for at least as long as a longest possible counting time of the pixel counters 160.

Figure 5:
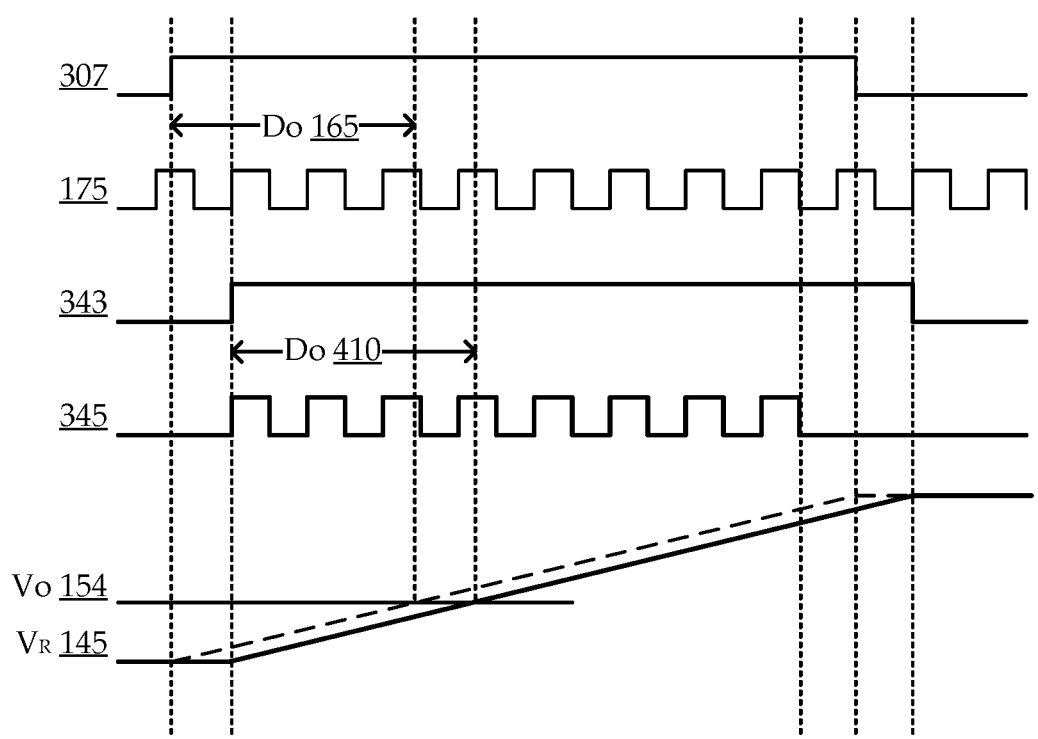
FIG. 5 shows simplified plots of illustrative signals of FIG. 4.

For added clarity, FIG. 5 shows simplified plots of illustrative signals of FIG. 4. As illustrated, a received ramp start signal 307 and a reference clocking signal 175 are received asynchronously from one or more components. For example, the received ramp start signal 307 is received from a higher-level controller, and the reference clocking signal 175 is received from a clock generator. Conventional approaches tend to control the ramp directly from the received ramp start signal 307 and to control counting directly according to the reference clocking signal 175. For example, according to the conventional pixel ADC 100 illustrated in FIG. 1 and the signals illustrated in FIG. 2, a conventional ramp generator controller can tend to generate a ramp start signal 125 to follow the received ramp start signal 307 (e.g., they may be the same signal). For the sake of context, an illustrative conventional ramp voltage 145 response is shown as a dashed line in FIG. 5. Upon a change in state of received ramp start signal 307 (e.g., a rising edge of received ramp start signal 307 and/or ramp start signal 125), the ramp voltage 145 begins rising from some low starting level, and continues to rise until the received ramp start signal 307 (and/or the ramp start signal 125) is de-asserted. According to the illustrated signals, the received ramp start signal 307 is asserted asynchronously in the middle of a clock cycle of the reference clocking signal 175. A conventional counter can count clock cycles of the reference clocking signal 175 to generate the digital output value 165.

In contrast, the novel pixel ADC system 400 of FIG. 4 can control the ramp from the generated ramp enable signal 343 and can control counting according to the generated ramp enable signal 343 and the generated output clocking signal 345. In some embodiments, the pixel ramp generator controller 300 ensures that the ramp enable signal 343 and the output clocking signal 345 become active synchronously with each other and substantially coincident with a next rising edge of the reference clocking signal 175 (as illustrated). In other embodiments, the pixel ramp generator controller 300 ensures that the ramp enable signal 343 and the output clocking signal 345 become active synchronously with each other, but not necessarily with the reference clocking signal 175 (i.e., they are generated using the reference clocking signal 175, but do not necessarily maintain synchronicity with the reference clocking signal 175). In response to assertion of the ramp enable signal 343, the ramp voltage 145 begins to rise (shown as a solid line). The ramp voltage 145 continues to rise for a predetermined ramp duration, until the ramp enable signal 343 is de-asserted. Further, the output clocking signal 345 can be triggered by the ramp enable signal 343 to begin tracking a clocking signal for a predetermined clock duration, after which the output clocking signal 345 becomes de-asserted. Pixel counters 160 of the novel pixel ADC system 400 can count clock cycles of the output clocking signal 345 to generate the digital output value 410.

In the illustrated example, it can be seen that the conventional pixel ADC system 100 will output a digital output value 165 indicating a count of three clock cycles corresponding to three rising clock edges of reference clocking signal 175 between the time the received ramp start signal 307 is asserted, and the time at which the dashed-line voltage ramp 145 crosses the analog pixel response level 154. As noted above, the asynchronous nature of the ramp control can yield an incorrect count value, which can manifest as coherent noise across a row of pixels. In comparison, it can be seen that the novel pixel ADC system 400 will generate a digital output value 410 indicating a count of four clock cycles corresponding to four rising clock edges of output clocking signal 345 between the time the ramp enable signal 343 is asserted and the time at which the solid-line voltage ramp 145 crosses the analog pixel response level 154. Thus, the novel pixel ADC system 400 can yield a correct count, which can improve noise performance of the ADC and the image sensor.

Embodiments of the pixel ramp generator controller 300, the novel pixel ADC system 400, and or any components of the novel pixel ADC system 400 can be generated using any suitable circuits, and/or other components. For example, the pixel ramp generator controller 300 can include, or can be implemented on, a central processing unit CPU, an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set (RISC) processor, a complex instruction set processor (CISC), a microprocessor, or the like, or any combination thereof.

Figure 6:
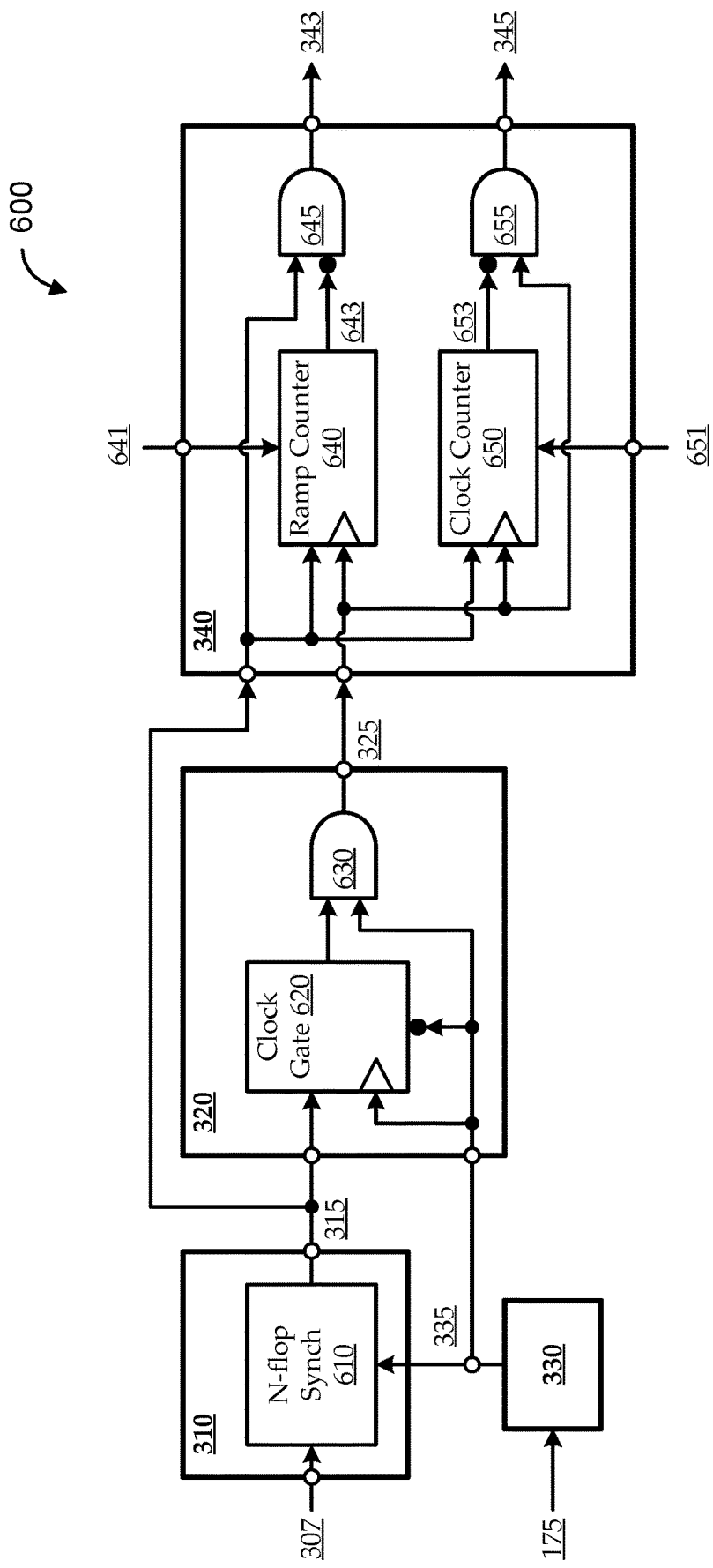
FIG. 6 shows an circuit block diagram of an illustrative pixel ramp generator controller, according to various embodiments.

FIG. 6 shows an circuit block diagram of an illustrative pixel ramp generator controller 600, according to various embodiments. The pixel ramp generator controller 600 can be an implementation of the pixel ramp generator controller 300 of FIG. 3. As illustrated, the pixel ramp generator controller 600 includes a ramp-to-clock synchronizer 310, a clock-to-ramp synchronizer 320, a ramp timing controller 340. Optionally, a duty cycle correction block 330 receives a reference clocking signal 175 (from a clock generator, or any suitable component), and generates an input clocking signal 335 to have a fifty-percent duty cycle. The remaining components control generation and output of a ramp enable signal 343 and an output clocking signal 345 based on the input clocking signal 335 and a received ramp start signal 307 (e.g., received from a higher-level controller, or any other suitable component).

In the illustrated embodiment, the ramp-to-clock synchronizer 310 includes an N-flop synchronizer 610. The N-flop synchronizer 610 includes an integer number (N) of flops (e.g., data flip flops (DFF), or any suitable type of flop circuit). The flops can be coupled in a chain, so that the data output (e.g., "Q" of a DFF) of each flop is coupled with the data input (e.g., "D" of a DFF) of the next flop in the chain. The data input of the first flop in the chain can be coupled with the received ramp start signal 307, and the data output of the last flop in the chain can be the corrected ramp start signal 315. The chain of flops can be synchronously clocked by the input clocking signal 335, such that a change in state of the received ramp start signal 307 propagates from flop to flop in the chain with each cycle of the input clocking signal 335.

The number of flops in the chain can be selected based on various factors. One factor can relate to metastability. With received ramp start signal 307 being asynchronous to the input clocking signal 335, it is possible for a state transition in the received ramp start signal 307 to occur within the setup and hold times of a flop, as clocked by the input clocking signal 335. In such a case, the output of a flop can be in a metastable state for an indeterminate amount of time. Using the received ramp start signal 307 could have undesirable results, such as potentially causing a counter to be triggered by a signal having a metastable (i.e., indeterminate) state. Each of the N flops of the N-flop synchronizer 610 can essentially quarantine a metastable output from downstream components of the pixel ramp generator controller 600 for a clock period, providing time for the metastable state to hopefully resolve to a stable state (e.g., HIGH or LOW). A higher N can further reduce the probability of such a metastable output. However, each additional flop in the chain also adds delay to the circuit. As such, the value of N is selected to balance factors, including balancing metastability performance against delay. According to one implementation, N is four.

Embodiments of the clock-to-ramp synchronizer 320 include a clock gate flop 620 and a clock gate logic component 630. The clock gate flop 620 has a data input coupled with the corrected ramp start signal 315. A clock input and a reset (complementary) input of the clock gate flop 620 are both coupled with the input clocking signal 335. As such, whenever the input clocking signal 335 is LOW, the clock gate flop 620 is in reset, and its output is LOW. Whenever the input clocking signal 335 is HIGH, the state of the corrected ramp start signal 315 at its data input is transferred to its data output. The clock gate logic component 630 can be a two-input AND gate, having one input coupled with the input clocking signal 335, and the other input coupled with the output of the clock gate flop 620. The output of the clock gate logic component 630 can be a controller clock signal 325. The output of the clock gate logic component 630 is HIGH only when both the input clocking signal 335 is HIGH and the output of the clock gate flop 620 is HIGH. This occurs whenever the input clocking signal 335 is HIGH after assertion of the corrected ramp start signal 315. As such, the controller clock signal 325 essentially tracks the input clocking signal 335, but is gated to account for component delay coming from the N-flop synchronizer 610.

Embodiments of the ramp timing controller 340 can include a ramp counter 640, a ramp output logic component 645, a clock counter 650, and a clock output logic component 655. Both the ramp counter 640 and the clock counter 650 can be clocked by the controller clock signal 325, and both can be triggered to begin their respective counts by the corrected ramp start signal 315. The ramp counter 640 can be configured to count for a predetermined ramp duration set by a ramp duration signal 641. For example, the ramp duration signal 641 can be a digital value representing a number of clock cycles of the controller clock signal 325 to count before ending its count. When its count is complete, the ramp counter 640 can output a ramp stop signal 643. The clock counter 650 can be configured to count for a predetermined clock duration set by a clock duration signal 651. For example, the clock duration signal 651 can be a digital value representing a number of clock cycles of the controller clock signal 325 to count before ending its count. When its count is complete, the clock counter 650 can output a clock stop signal 653.

The ramp output logic component 645 can be a two-input AND gate having its first input coupled with the corrected ramp start signal 315 and its second input coupled with the complement of the ramp stop signal 643. The output of the ramp output logic component 645 can be the ramp enable signal 343. As such, the ramp enable signal 343 will be HIGH only when the corrected ramp start signal 315 is asserted and the ramp stop signal 643 is not asserted; the ramp enable signal 343 will be HIGH over a timeframe beginning from when the corrected ramp start signal 315 is asserted and extending until the end of the predetermined ramp duration. The clock output logic component 655 can be a two-input AND gate having its first input coupled with the controller clock signal 325 and its second input coupled with the complement of the clock stop signal 653. The output of the clock output logic component 655 can be the output clocking signal 345. As such, the output clocking signal 345 will essentially track the controller clock signal 325 during a timeframe that begins when the corrected ramp start signal 315 is asserted and extends for the predetermined clock duration; and the output clocking signal 345 will essentially be off otherwise.

Some embodiments are configured to operate at very high clock speeds. For example, it may be desirable for a particular application to run the ramp counter 640 and clock counter 650 at clock frequencies of above 1 GHz (e.g., using a 2.5 GHz reference clocking signal 175 to generate a 2.5 GHz controller clock signal 325). Many conventional counter architectures tend not to be able to operate at such high frequencies. Further, with down counters, it can be desirable to preload the counter with an initial starting value from which to count down and to detect when the counter reaches zero (or some final value), but the types of flops and other components that permit such preloading and zero detection tend not to operate at very high clock frequencies. For example, T flip flops typically have a maximum operating frequency below the Gigahertz range.

Figure 7:
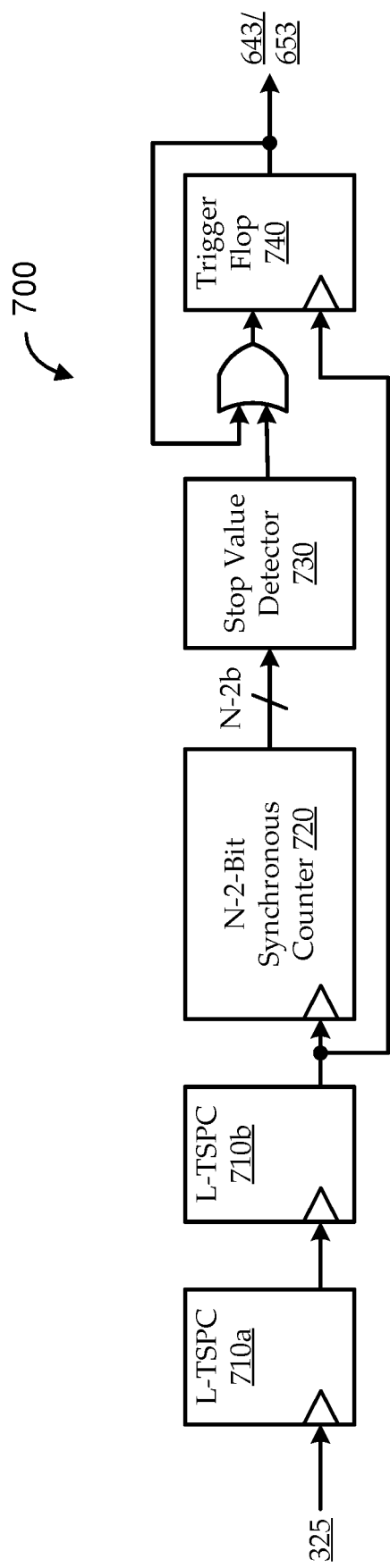
FIG. 7 shows a circuit block diagram of an illustrative down counter architecture for implementation of the ramp counter and/or clock counter at high clock frequencies, according to various embodiments.

FIG. 7 shows a circuit block diagram of an illustrative down counter architecture 700 for implementation of the ramp counter 640 and/or clock counter 650 at high clock frequencies, according to various embodiments. The down counter architecture 700 is implemented as a hybrid between a ripple counter and a synchronous counter 720. During operation, flops of the ripple and synchronous counters are preloaded with a starting value (e.g., a ramp start value or a clock start value, etc.). The down counter architecture 700 is then triggered, in accordance with the corrected ramp start signal 315, to begin counting down from that starting value. At some point in the countdown, a predetermined stop value condition (e.g., all-zeroes) is reached, which is detected by a stop value detector 730. When the stop value detector 730 detects the stop value condition, the stop value detector 730 can assert a detection output signal. A trigger flop 740 coupled with the stop value detector 730 can assert a stop signal (i.e., either the ramp stop signal 643 or the clock stop signal 653) responsive to detecting assertion of the detection output signal. The trigger flop 740 can hold the stop signal asserted until the down counter architecture 700 is reset.

As illustrated, the down counter architecture 700 can be implemented as an N-bit down-counter clocked by the controller clock signal 325. The synchronous counter 720 can be implemented using conventional counter components, such as toggle flip flops (TFFs) or data flip flops (DFFs). It is assumed that the clock frequency of the controller clock signal 325 is too fast for reliable operation of the flops of the synchronous counter 720. As such, an integer number (J) (i.e., one or more) least significant bits (LSBs) of the down counter architecture 700 are implemented as a ripple counter with a special type of flop that can operate at very high clock speeds, loadable true-single-phase-clocked (L-TSPC) flops 710. The J L-TSPC flops 710 are configured as a ripple counter, and the output of the ripple counter is used as the synchronous clock for the synchronous counter 720. As such, each L-TSPC flop 710 can divide down the clock frequency of the controller clock signal 325 until it is at a suitable clock frequency for use as the synchronous clock for the synchronous counter 720. For example, if the ripple counter receives the controller clock signal 325 at an input frequency (F), it will output a divided clock signal at a divided frequency of $F/(2^J)$. The divided clock signal is then usable as a synchronous clock for the N–J flops of the synchronous counter 720.

Embodiments of L-TSPC flops 710 are described in U.S. patent application Ser. No. 17/164,722, titled "LOADABLE TRUE-SINGLE-PHASE-CLOCKING FLOP," filed on Feb. 1, 2021, the entire disclosure of which is hereby incorporated by reference. Generally, each L-TSPC flop 710 is configured to operate, responsive to a set of control signals, in a selected one of at least a normal mode, a set loading mode, and a reset loading mode. In the set loading mode, control signals (e.g., set and reset signals) can be configured to hold the output (e.g., Q-bar) of the L-TSPC flop 710 in a first state (e.g., HIGH); and in the reset loading mode, the control signals can be configured to hold the output of the L-TSPC flop 710 in a second state (e.g., LOW) that is the complement of the first state. In the set and reset loading modes, the output of the L-TSPC flop 710 is held in a deterministic state and is not impacted by changing states of an input clocking signal (e.g., or absence of such a signal). In the normal mode, the L-TSPC flop 710 can substantially mimic operation of a conventional TSPC flop, such that the state of the output of the L-TSPC flop 710 can be a function of changes in the state of the input clocking signal. For example, by coupling the output of the L-TSPC flop 710 with its input, the L-TSPC flop 710 can effectively operate as a clock divider that supports very high speed clocking.

The number of L-TSPC flops 710 can be selected based on a balance of factors. On one side of the balance, it is desirable to use enough L-TSPC flops 710 to sufficiently divide down the clock frequency to be suitable for clocking flops of the synchronous counter 710. On the other side of the balance, it is well established that conventional TSPC flops (and, similarly, L-TSPC flops 312 when operating in normal mode) tend to fail when operating below a relatively high minimum clocking frequency. If clocking of the flop stops, or becomes too slow, the outputs of the TSPC flop can quickly devolve to an indeterminate states because of parasitic capacitances and other electrical factors, and there can be leakage between the power supply level and ground level through the TSPC flop. For this reason, TSPC flops tend not to be used in counters. Thus, in the down counter architecture 700, the number of L-TSPC flops 710 in the ripple counter can be selected so that the last L-TSPC flop 710 in the ripple counter is clocked by a clocking signal that is still fast enough for its own reliable operation, but outputs a divided clocking signal that is slow enough to be usable for clocking the flops of the synchronous counter 720. Further, each additional flop that is added to the ripple counter configuration adds delay, which can be undesirable.

Similar to the synchronous counter 720, it can be difficult to implement the stop value detector 730 to be fast enough to run at the clocking speed of the controller clock signal 325. In some embodiments, the stop value detector 730 is configured to detect the stop value condition as occurring when all N-J bits of the synchronous counter 720 have reached '0' (an "all-zero condition"). In such embodiments, the start value preloaded into the down counter architecture 700 is the desired number of clock cycles corresponding to the predetermined ramp or clock duration (depending on whether the down counter architecture 700 is being used to implement the ramp counter 640 or the clock counter 650, respectively) plus $(2^J)-1$. For example, the illustrated embodiment includes two L-TSPC flops 710 (i.e., J=2), such that the preloaded start value would be increased by 3 (i.e., $(2^3)-1=3$). If the down counter architecture 700 is an 11-bit counter, and it is desired for the down counter architecture 700 to countdown for a duration of 90 clock cycles, flops of the ripple and synchronous counters can be loaded to a value of 93 (i.e., '00001011101'). When the countdown reaches a value of 3 ('00000000011' binary), all the flop outputs in the synchronous counter 720 (representing the more significant bits) will be '0', causing the stop value detector 730 to detect the all-zero condition. As the L-TSPC flops 710 are generating the divided clock, they will necessarily all be at '1' when the synchronous counter 720 flops reach the all-zero condition (i.e., a value of 3 will remain). As described above, responsive to the stop value detector 730 detecting the all-zero condition (of the N-J most significant bits), the stop value detector 730 can assert the detection output signal, causing the trigger flop 740 to assert and hold a stop signal (i.e., either the ramp stop signal 643 or the clock stop signal 653).

While the above embodiments refer specifically to down-counters that count down from a pre-load value to an all-zero (or adjusted all-zero) condition, other types of counters can be used in various embodiments. Some embodiments can use down-counters, such as those described with reference to FIG. 7, but the stop value detector 730 is configured to detect any suitable predetermined ending value other than all-zeroes (e.g., all '1's). Some embodiments can implement the ramp counter 640 and/or the clock counter 650 using one or more up-counters. In one such implementation, rather than counting down from a pre-load value, the up-counter(s) can count up from all zeroes until a predetermined stop value is reached and detected by the stop value detector 730. In another such implementation, the up-counter(s) can be preloaded to a start value that is less than zero by the desired count duration; such that the count is complete when the up-counter has counted up to an all-zero condition (i.e., when the stop value detector 730 detects all '0's, or corresponding condition modified for non-'0' values of the L-TSPC flops 710). Other implementations can configure the up-counter(s) to be preloaded to any suitable start value and to trigger an end of counting using any suitable stop value.

Figure 8:
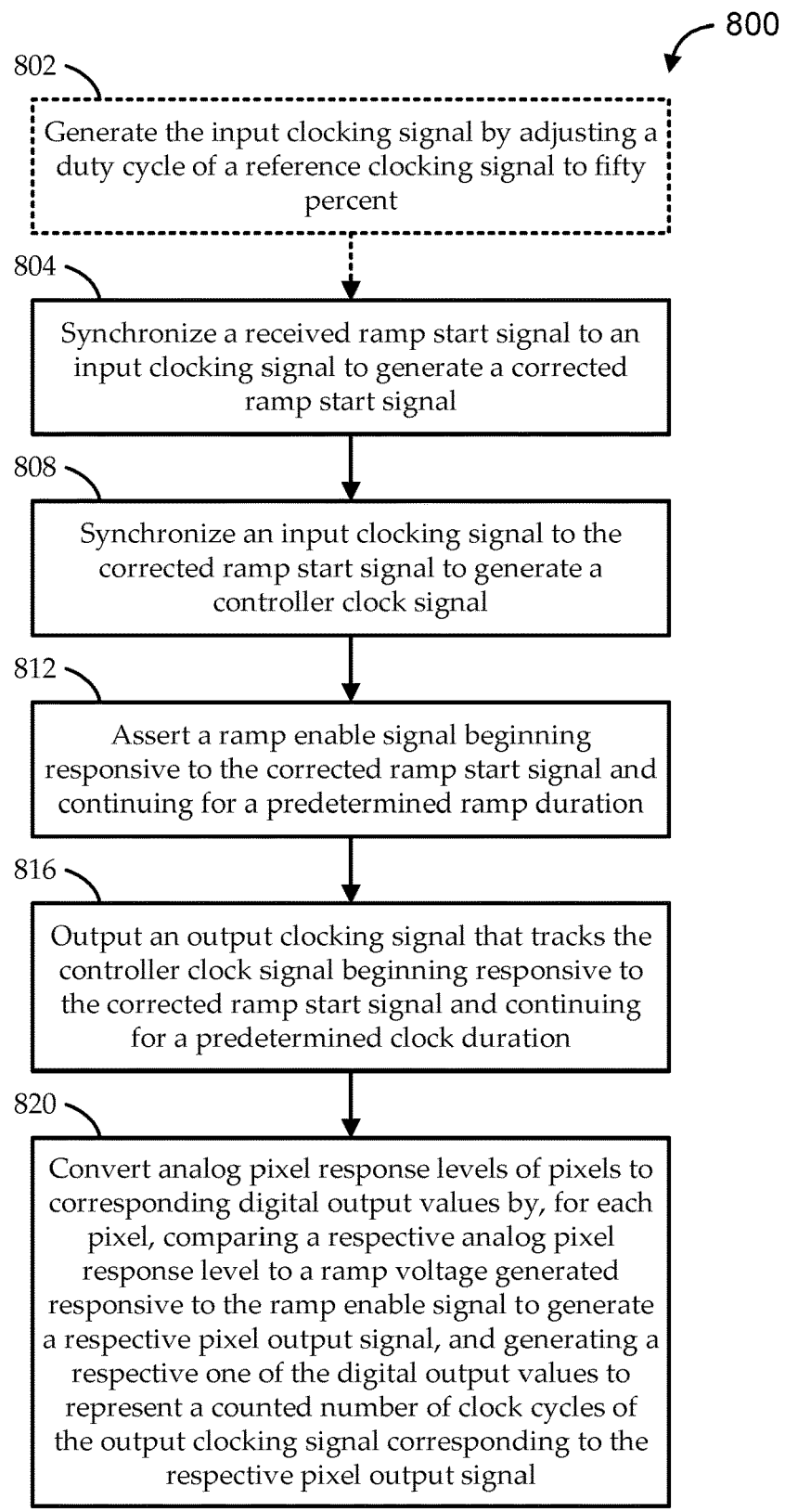
FIG. 8 shows a flow diagram of an illustrative method for pixel conversion in an image sensor, according to various embodiments.

FIG. 8 shows a flow diagram of an illustrative method 800 for pixel conversion in an image sensor, according to various embodiments. Embodiments of the method 800 can begin at stage 804 by synchronizing a received ramp start signal to an input clocking signal to generate a corrected ramp start signal. Some embodiments optionally begin at stage 802 by receiving a reference clocking signal from a reference clock generator and generating the input clocking signal (used in stage 804) by adjusting a duty cycle of the reference clocking signal to fifty percent. At stage 808, embodiments can synchronize an input clocking signal to the corrected ramp start signal to generate a controller clock signal.

At stage 812, embodiments can assert a ramp enable signal beginning responsive to the corrected ramp start signal and continuing for a predetermined ramp duration. In some implementations, the asserting at stage 812 involves loading a ramp counter with a start value corresponding to the predetermined ramp duration, and counting down from the start value until an all-zero condition is reached. The counting down can begin responsive to the corrected ramp start signal and can be clocked by the controller clock signal, such the ramp enable signal is asserted during the counting down and is de-asserted responsive to reaching the stop value condition (e.g., the all-zero condition).

At stage 816, embodiments can output an output clocking signal that tracks the controller clock signal beginning responsive to the corrected ramp start signal and continuing for a predetermined clock duration. In some implementations, the outputting at stage 816 involves loading a clock counter with a start value corresponding to the predetermined clock duration, and counting down from the start value until an all-zero condition is reached. The counting down can begin responsive to the corrected ramp start signal and can be clocked by the controller clock signal, such the output clocking signal tracks the controller clock signal during the counting down and is de-asserted otherwise.

At stage 820, embodiments can convert multiple analog pixel response levels of multiple pixels to a corresponding multiple digital output values. For each pixel, embodiments can compare a respective one of the analog pixel response levels to a ramp voltage generated responsive to the ramp enable signal to generate a respective pixel output signal. Embodiments can then generate a respective one of the plurality of digital output values to represent a counted number of clock cycles of the output clocking signal corresponding to the respective pixel output signal.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second." "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A pixel ramp generator controller, comprising:
   a ramp-to-clock synchronizer to generate a corrected ramp start signal based on synchronizing a received ramp start signal to an input clocking signal;
   a clock-to-ramp synchronizer coupled with the ramp-to-clock synchronizer to generate a controller clock signal based on synchronizing the input clocking signal to the corrected ramp start signal; and
   a ramp timing controller coupled with the ramp-to-clock synchronizer and the clock-to-ramp synchronizer to:
      generate a ramp enable signal that indicates to start charging a ramp voltage responsive to assertion of the corrected ramp start signal, and to stop charging the ramp voltage responsive to detecting that a predetermined ramp duration has elapsed after the corrected ramp start signal; and
      generate an output clocking signal from the controller clock signal, such that generating the output clocking signal begins responsive to assertion of the corrected ramp start signal and ends responsive to detecting that a predetermined clock duration has elapsed after the corrected ramp start signal.

2. The pixel ramp generator controller of claim 1, further comprising:
   a duty cycle correction block to generate the input clocking signal by receiving a reference clocking signal from a reference clock generator and adjusting a duty cycle of the reference clocking signal to fifty percent.

3. The pixel ramp generator controller of claim 1, wherein:
   the ramp-to-clock synchronizer comprises N flops coupled in a chain, such that:
   each of the N flops has a respective clock input coupled with the input clocking signal;
   a respective data output of each of first through (N−1)th flops of the N flops is coupled with a respective data input of each of second through Nth flops of the N flops, respectively;
   the respective data input of the first flop is coupled with the received ramp start signal; and
   the respective data output of the Nth flop is the corrected ramp start signal.

4. The pixel ramp generator controller of claim 1, wherein:
   the clock-to-ramp synchronizer comprises a gating circuit to generate the controller clock signal by using the corrected ramp start signal to gate the input clocking signal, such that the controller clock signal is glitch free with a same duty cycle as the input clocking signal.

5. The pixel ramp generator controller of claim 4, wherein the gating circuit comprises:
   a flop having a data input coupled with the corrected ramp start signal, a clock input coupled with the input clocking signal, a reset input coupled with the input clocking signal, and a data output; and
   a logic component having a first logic input coupled with the data output of the flop, a second logic input coupled with the input clocking signal, and an logic output generated as a function of the data output of the flop and the input clocking signal,
   the logic output being the controller clock signal.

6. The pixel ramp generator controller of claim 1, wherein the ramp timing controller comprises:
   a ramp counter configured to be clocked by the controller clock signal, to be triggered by the corrected ramp start signal to start counting clock cycles of the controller clock signal for a number of clock cycles corresponding to the predetermined ramp duration, and to assert a ramp stop signal upon completion of the counting clock cycles of the controller clock signal for the number of clock cycles.

7. The pixel ramp generator controller of claim 6, wherein the ramp timing controller further comprises:
   digital logic to generate the ramp enable signal to be asserted responsive to detecting assertion of the corrected ramp start signal, and to be de-asserted responsive to detecting assertion of the ramp stop signal.

8. The pixel ramp generator controller of claim 6, wherein the ramp counter comprises:
   an N-bit counter clocked by the controller clock signal, configured to be loaded with a start value corresponding to the number of clock cycles corresponding to the predetermined ramp duration, and configured to begin counting from the start value responsive to the corrected ramp start signal;
   a stop value detector coupled with the N-bit counter and configured to assert a detection output signal upon detecting a stop value condition of the N-bit counter; and
   a trigger flop coupled with the stop value detector and configured to assert the ramp stop signal responsive to detecting assertion of the detection output signal, and to hold the ramp stop signal asserted until the ramp counter is reset.

9. The pixel ramp generator controller of claim 8, wherein:
the N-bit counter comprises:
a clock divider stage having J loadable true-single-phase-clocked (L-TSPC) flops arranged as a ripple counter to receive the controller clock signal at an input frequency (F) and to output a divided clock signal at a divided frequency [F/(2^J)]; and
a down-counter stage having N–J toggle flip-flops synchronously clocked by the divided clock signal;
the start value is the number of clock cycles corresponding to the predetermined ramp duration plus (2^J)–1; and
the stop value detector is configured to detect the stop value condition as an all-zero condition of the N-bit down-counter when respective outputs of all of the N–J toggle flip-flops indicate zero.

10. The pixel ramp generator controller of claim 9, wherein:
the N-bit down-counter is an 11-bit down-counter;
the clock divider stage has two L-TSPC flops; and
the down-counter stage has 9 toggle flip-flops.

11. The pixel ramp generator controller of claim 1, wherein the ramp timing controller comprises:
a clock counter configured to be clocked by the controller clock signal, to be triggered by the corrected ramp start signal to start counting clock cycles of the controller clock signal for a number of clock cycles corresponding to the predetermined clock duration, and to assert a clock stop signal upon completion of the counting clock cycles of the controller clock signal for the number of clock cycles; and
digital logic to generate the output clocking signal to track the controller clock signal when the clock stop signal is de-asserted, and to stop tracking the controller clock signal when the clock stop signal is asserted.

12. The pixel ramp generator controller of claim 1, wherein the input clocking signal has a frequency of at least one Gigahertz.

13. A pixel analog-to-digital conversion (ADC) system, comprising:
a pixel ramp generator controller configured to:
assert a ramp enable signal beginning responsive to a corrected ramp start signal and continuing for a predetermined ramp duration; and
generate an output clocking signal that tracks a controller clock signal beginning responsive to the corrected ramp start signal and continuing for a predetermined clock duration,
wherein the corrected ramp start signal corresponds to a received ramp start signal synchronized to an input clocking signal, and the controller clock signal corresponds to an input clocking signal synchronized to the corrected ramp start signal;
a ramp generator coupled with the pixel ramp generator controller to generate a ramp voltage responsive to the ramp enable signal;
a plurality of pixel comparators coupled with the ramp generator, each to generate a respective pixel output signal responsive to comparing a respective analog pixel response level with the ramp voltage; and
a plurality of pixel counters, each coupled with a respective one of the plurality of pixel comparators and with the pixel ramp generator controller to output a respective digital output value representing a counted number of clock cycles of the output clocking signal corresponding to the respective pixel output signal of the respective one of the plurality of pixel comparators.

14. The pixel ADC system of claim 13, wherein:
a maximum analog pixel response level defines a maximum counted number of clock cycles for the plurality of pixel counters; and
the predetermined ramp duration and the predetermined clock duration are longer than the maximum counted number of clock cycles.

15. The pixel ADC system of claim 13, wherein the pixel ramp generator controller comprises:
a ramp counter configured to be loaded with a ramp start value corresponding to the predetermined ramp duration, and to count from the start value until a ramp stop value condition is reached, the counting beginning responsive to the corrected ramp start signal and clocked by the controller clock signal, such the ramp enable signal is asserted during the counting and is de-asserted responsive to reaching the ramp stop value condition; and
a clock counter configured to be loaded with a clock start value corresponding to the predetermined clock duration, and to count from the start value until a clock stop value condition is reached, the counting beginning responsive to the corrected ramp start signal and clocked by the controller clock signal, such the output clocking signal tracks the controller clock signal during the counting and is de-asserted otherwise.

16. The pixel ADC system of claim 13, wherein the pixel ramp generator controller comprises:
a duty cycle correction block to generate the input clocking signal by receiving a reference clocking signal from a reference clock generator and adjusting a duty cycle of the reference clocking signal to fifty percent.

17. A method for pixel conversion in an image sensor, the method comprising:
synchronizing a received ramp start signal to an input clocking signal to generate a corrected ramp start signal;
synchronizing the input clocking signal to the corrected ramp start signal to generate a controller clock signal;
asserting a ramp enable signal beginning responsive to the corrected ramp start signal and continuing for a predetermined ramp duration;
outputting an output clocking signal that tracks the controller clock signal beginning responsive to the corrected ramp start signal and continuing for a predetermined clock duration; and
converting a plurality of analog pixel response levels of a plurality of pixels to a corresponding plurality of digital output values by, for each pixel, comparing a respective one of the plurality of analog pixel response levels to a ramp voltage generated responsive to the ramp enable signal to generate a respective pixel output signal, and generating a respective one of the plurality of digital output values to represent a counted number of clock cycles of the output clocking signal corresponding to the respective pixel output signal.

18. The method of claim 17, further comprising:
receiving a reference clocking signal from a reference clock generator; and
generating the input clocking signal by adjusting a duty cycle of the reference clocking signal to substantially fifty percent.

19. The method of claim 17, wherein the asserting the ramp enable signal comprises:
  loading a ramp counter with a start value corresponding to the predetermined ramp duration; and
  counting, by the ramp counter, from the start value until a stop value condition is reached, the counting beginning responsive to the corrected ramp start signal and clocked by the controller clock signal,
  such the ramp enable signal is asserted during the counting and is de-asserted responsive to reaching the stop value condition.

20. The method of claim 17, wherein the outputting the output clocking signal comprises:
  loading a clock counter with a start value corresponding to the predetermined clock duration; and
  counting, by the clock counter, from the start value until a stop value condition is reached, the counting down beginning responsive to the corrected ramp start signal and clocked by the controller clock signal,
  such the output clocking signal tracks the controller clock signal during the counting and is de-asserted otherwise.

\* \* \* \* \*